United States Patent Office 2,928,794
Patented Mar. 15, 1960

2,928,794

CURING OF POLYEPOXIDES

William J. Belanger and Harold G. Cooke, Jr., Louisville, Ky., assignors to Devoe & Raynolds Co., Inc., a corporation of New York No Drawing. Application December 5, 1956
Serial No. 626,302

6 Claims. (Cl. 260—2)

This invention relates to a process for the curing of polyepoxides. In one of its aspects the invention relates to a new process for curing polyepoxides using selected amine-type curing agents and special accelerators for the curing agents.

Amines are widely employed in the curing of epoxide resins. It is known, however, that primary and secondary amines differ from tertiary amines in their reactions with polyepoxides. The difference in the use of primary amines on one hand and tertiary amines on the other has been attributed to the fact that the curing of polyepoxides with primary amines involves the reaction of the polyepoxide with the amine by addition, whereas the use of a tertiary amine as a curing agent contemplates a catalytic reaction. The reaction of a secondary amine with a polyepoxide includes an addition reaction and a catalytic reaction. In accordance with this invention the addition reaction is promoted using accelerators or activators not heretofore suggested for this use. By the practice of the invention a process is provided whereby a single primary or secondary amine is used over a much wider range of curing conditions. Within the contemplation of this invention fewer curing agents can be used and conditions varied by the amount of accelerator employed in conjunction therewith.

According to the practice of this invention, quaternary ammonium salts of strong acids are capable of accelerating the reaction between polyepoxides and primary or secondary amines. In addition, at a given temperature and with a given primary or secondary amine curing agent, faster curing times are produced by increasing the amount of activator. Using less activator, slower curing times are obtainable. Hence, if desired, rather than using a different amine for each curing time a single amine having a slow curing time is used and the curing time is increased as desired depending upon the amount of accelerator employed. These quaternary ammonium salts have the additional advantage of being neutral and in admixture with a polyepoxide they are stable until heated.

This invention, therefore, provides a process for curing polyepoxides which includes mixing and reacting the polyepoxide with a primary or secondary amine curing agent, i.e., an organic amine, a polyamine, etc., and an activator for the curing agent comprising a neutral salt, i.e., a quaternary ammonium salt of a strong acid, preferably a quaternary ammonium halide. It has been found that when the amine curing agent is used in combination with these activators they display surprisingly high activity as curing agents for polyepoxides. As will be readily apparent, there is a remarkable increase in curing rate when these initiators are used.

Neutral quaternary ammonium salts within the contemplation of this invention include quaternary ammonium salts of strong acids. In general, quaternary ammonium salts of strong acids are soluble and quaternary ammonium halides, in particular, are quite hygroscopic in nature. Accordingly, it is desirable to employ aqueous solutions of the quaternary ammonium halides. Other quaternary ammonium salts can also be employed in solution, in water, alcohol, etc. Quaternary ammonium salts within the contemplation of this invention are tetraalkyl, aryl trialkyl and alkaryl trialkyl ammonium salts of strong acids wherein the aryl, alkaryl and alkyl substituents each have no more than eight carbon atoms. Examples of such quaternary ammonium compounds are benzyltrimethyl ammonium chloride, benzyltrimethyl ammonium phosphate, trimethyl benzyl ammonium sulphates, benzyltriethyl ammonium chloride, tributyl benzyl ammonium chloride, tripropyl benzyl ammonium chloride, tolyl trimethyl ammonium chloride, octyl trimethyl ammonium bromide. Preferred salts are the quaternary ammonium halides. Also intended are ion exchange resins containing quaternary ammonium salts of strong acids.

Polyepoxides are now well known and need not be discussed at length herein. The most useful of these epoxide resins is made from the reaction of a polyhydric phenol with epihalohydrin or glycerol dihalohydrin, and a sufficient amount of a caustic alkali to combine with the halogen of the halohydrin. Products resulting from the reaction of a polyhydric phenol with epichlorhydrin or glycerol dichlorhydrin are monomeric or straight chain polymeric products characterized by the presence of more than one epoxide group, i.e., a 1,2-epoxy equivalency greater than one. Dihydric phenols that can be used for this purpose include bisphenol, resorcinol, catechol, hydroquinone, methyl resorcinol, 2,2-bis(4-hydroxyphenyl)butane, 4,4'-dihydroxybenzophenone, bis(4-hydroxyphenyl)ethane, and 1,5-dihydroxy naphthalene. The preparation of polyepoxides from polyhydric phenols and epihalohydrin is described in U.S. Patents 2,467,171, 2,538,072, 2,582,985, 2,615,007 and 2,698,315, the proportion of the halohydrin (epichlorhydrin or glycerol dichlorhydrin) to dihydric phenol being at least about 1.2 to one, up to around ten to one. While the invention is applicable to epoxides generally, preferred polyepoxides are normally liquid glycidyl polyethers of aromatic polyhydric compounds, for example, those having melting points below 30° C., and generally weights per epoxide group of less than three hundred.

Any of the known primary or secondary amine curing agents are employed in the curing of polyepoxides according to this invention. Organic monoamines and polyamines are very suitable. Included are aliphatic, cycloaliphatic, heterocyclic, and aromatic amines containing at least one hydrogen atom attached to the nitrogen atom. Particularly useful are aromatic amines since they do not normally act as rapidly as do aliphatic amines. Also intended are piperidine, meta-phenylene diamine, diamino diphenyl methane, p,p'-methylene dianaline, triethylene tetramine, 3-diamino-4-isopropyl benzene, etc.

In carrying out the process of this invention, the polyepoxide is cured by mixing the amine curing agent and the activator with the polyepoxide. The amount of amine-type curing agent to be used in curing polyepoxides is known to vary over a wide range, almost any amount having some effect. Normally not more than 1.5 equivalents of an amine is used per epoxy equivalent. The expression "amine equivalent" refers to the amount of amine curing agent needed to furnish one amino substituted hydrogen atom. To obtain the best results the amine-type curing agent is employed in about at least one amine equivalent for every epoxy group in the polyepoxide to be involved in the cure. More generally, from 0.2 to 1.5 amine equivalents are used per epoxy group.

The quaternary ammonium salts on the other hand, are needed only in very small amounts. Excellent results are obtained when the activator is utilized in amounts varying from 0.1 percent to ten percent by weight of the resin, i.e., resin containing both polyepoxide and amine curing agent, and more preferably in amounts varying from 0.1 percent to two percent by weight of the resin.

In effecting the cure, the temperature range will vary with the particular amine curing agent and the amount of activator used. By proper selection of amine-type curing agents and by proper adjustment of the amount of activator, almost any desired curing temperature can be employed. Excellent rates of cure are obtained at temperatures ranging from about 40° C. to 200° C. and these are the preferred temperatures to be used. Temperatures much above 200° C. are generally not desirable, but may be employed if necessary.

The preparation of these compositions can best be understood by reference to certain specific examples. To illustrate effectively the stability of amine, polyepoxide, quaternary ammonium salt mixtures, gel times are given rather than curing times, the gel being the first stage of an infusible, insoluble material. It is understood that the examples are illustrative only and other variations will occur to those skilled in the art.

Example 1

In a reaction vessel equipped with an agitator, thermometer and condenser, about one mol of bisphenol is dissolved in ten mols of epichlorhydrin and one to two percent water is added to the resulting mixture. The mixture is then brought to 80° C. and two mols of sodium hydroxide are added in small portions over a period of about one hour. During the addition, the temperature of the mixture is held at about 90° C. to 110° C. After the sodium hydroxide has been added, the water formed in the reaction and most of the epichlorhydrin is distilled off. The residue is combined with an approximately equal amount of benzene and the mixture is filtered to remove the salt. The benzene is then removed to yield a viscous liquid polyepoxide having a weight per epoxide of 185.

Example 2

In a suitable container, nineteen parts by weight of the polyepoxide of Example 1 and 4.6 parts by weight of benzidine are heated with stirring at 90° C. to 100° C. until a clear melt is obtained. Into this melt are rapidly stirred 0.3 part by weight of anhydrous benzyltrimethyl ammonium chloride. The mixture is poured into an aluminum cup and is baked at 100° C. Gelation of the composition occurs after baking for nine minutes. Another composition of the same amounts of the polyepoxide of Example 1 and benzidine treated in the same manner but without benzyltrimethyl ammonium chloride requires eighteen minutes for gelation.

Example 3

A. In a suitable container, ten parts by weight of the polyepoxide of Example 1 and 0.50 part by weight of piperidine are combined with stirring. Into this solution is rapidly stirred 0.50 part by weight of a sixty percent aqueous solution of benzyltrimethyl ammonium chloride. The resulting mixture is poured into an aluminum cup and is heated at 125° C. until initial gelation occurs after forty minutes.

B. The following table is a compilation of results of employing various proportions of an aqueous solution of benzyltrimethyl ammonium chloride as an accelerator in the procedure described in part A of this example, the solution consisting of sixty parts of benzyltrimethyl ammonium chloride in forty parts of water. Examples are included to show the effect of water alone. For comparison, the amount of water used alone is the same as that used in the aqueous solution. Thus, 0.50 part of the sixty percent aqueous solution of benzyltrimethyl ammonium chloride contains 0.2 part of water. Results are given showing the effect of this amount of water alone, as well as the amount of water in 0.17 part of the sixty percent aqueous solution of benzyltrimethyl ammonium chloride, i.e., about 0.07.

| Polyepoxide, Parts by weight | Piperidine, Parts by weight | BTMACL,[1] Parts by weight | Water, Parts by weight | Temperature, ° C. | Gel Time (Minutes) |
|---|---|---|---|---|---|
| 10.0 | 0.50 | 0.0 | 0.0 | 100 | No gel in 210 minutes. |
| 10.0 | 0.50 | 0.17 | 0.0 | 100 | Do. |
| 10.0 | 0.50 | 0.50 | 0.0 | 100 | 140. |
| 10.0 | 0.50 | 0.0 | 0.0 | 125 | 325. |
| 10.0 | 0.50 | 0.0 | 0.07 | 125 | 315. |
| 10.0 | 0.50 | 0.0 | 0.20 | 125 | 120. |
| 10.0 | 0.50 | 0.17 | 0.0 | 125 | 105. |
| 10.0 | 0.50 | 0.50 | 0.0 | 125 | 40.[2] |

[1] BTMACL represents benzyltrimethyl ammonium chloride (sixty percent aqueous solution).
[2] Example 3—Part A.

Example 4

The table of this example is a compilation of comparative results obtained by heating at 65° C. until a clear solution results, ten parts by weight of the polyepoxide of Example 1 with 1.4 parts by weight of metaphenylene diamine. Into this solution is stirred rapidly, varying amounts of a sixty percent aqueous solution of benzyltrimethyl ammonium chloride. The resulting mixture is poured into an aluminum cup and is heated to gelation at 80° C.

As a basis for comparison, an example of the process with the exclusion of the catalyst is included.

| Polyepoxide, Parts By Wt. | Metaphenylene Diamine, Parts By Wt. | BTMACL,[1] Parts By Wt. | Gel Time (Minutes) at 80° C. |
|---|---|---|---|
| 10.0 | 1.4 | 0.0 | 60 |
| 10.0 | 1.4 | 0.17 | 30 |
| 10.0 | 1.4 | 0.50 | 15 |

[1] BTMACL represents benzyltrimethyl ammonium chloride (sixty percent aqueous solution).

Example 5

In a suitable container nineteen parts by weight of the polyepoxide of Example 1 and 6.2 parts by weight of diamino diphenyl sulfone are heated at an elevated temperature of not over 150° C. with stirring until a clear melt is obtained. Into this melt are rapidly stirred 0.3 part by weight of anhydrous benzyltrimethyl ammonium chloride, whereupon the composition is poured into an aluminum cup and is baked at 150° C. The composition gels after baking for thirteen minutes. Another mixture of Example 1 and diamino diphenyl sulfone, treated in the same manner but with the exclusion of the benzyltrimethyl ammonium chloride requires fifty-three minutes for gelation.

Example 6

According to the procedure outlined in Example 3, ten parts by weight of the polyepoxide of Example 1, 0.50 part by weight of piperidine and 0.10 part by weight of anhydrous benzyltrimethyl ammonium chloride are combined and heated at 125° C. Gelation occurs after heating for ninety-three minutes.

Example 7

According to the procedure of Example 3, ten parts by weight of the polyepoxide of Example 1, and 0.50 part by weight of piperidine are combined. Benzyltrimethyl ammonium sulphate (0.30 part by weight) is employed as a catalyst for the process. The mixture, heated at 125° C., gels in eighty minutes.

Example 8

In a reaction vessel equipped with agitator, condenser and thermometer, about 276 parts (three mols) of glycerol are mixed with 832 parts (nine mols) of epichlorhydrin. To this reaction mixture are added ten parts of diethyl ether solution containing about 4.5 percent boron trifluoride, according to U.S. Patent 2,581,464. The temperature of this mixture is held between 50° C. and 75° C. for about three hours. About 370 parts of the resulting glycerol-epichlorhydrin condensate are dissolved in nine hundred parts of dioxane containing about three hundred parts of sodium aluminate. While agitating, the reaction mixture is heated and refluxed at 93° C. for nine hours. After cooling to room temperature, the insoluble material is filtered from the reaction mixture and low boiling substances are removed by distillation to a temperature of about 150° C. at 20 mm. pressure. The resulting polyepoxide is a pale yellow viscous liquid containing between two and three epoxide groups per molecule having a weight per epoxide of 155.

Example 9

In a suitable container, ten parts by weight of the polyepoxide of Example 8 and five parts by weight of pyridine are combined with stirring. Into this solution is rapidly stirred 0.30 part by weight of anhydrous benzyltrimethyl ammonium chloride. The resulting mixture is poured into an aluminum cup and is heated at 125° C. until initial gelation occurs after 305 minutes.

Another portion (ten parts by weight) of the polyepoxide of Example 8 and five parts by weight of pyridine treated in the same manner but excluding the catalyst does not gel after heating at 125° C. for five hundred minutes.

Example 10

In a reaction vessel fitted with a stirrer, thermometer and condenser, about 650 parts (2.85 mols) of 2,2-bis(4-hydroxyphenyl)propane and 218 parts (5.45 mols) of sodium hydroxide (twenty percent excess) are combined in 1900 parts of water and heated at about 29° C. for twenty minutes, whereupon 414 parts (4.48 mols) of epichlorhydrin are added rapidly. The temperature of the mixture is increased over a period of fifteen minutes to 93° C.–100° C. and is held at this temperature for one hour and thirty-five minutes. The mixture is separated into a two phase system and the aqueous layer is drawn off. The remaining resinous layer is washed with hot water and then is drained and dried at 140° C. The Durrans' mercury method melting point of the resulting polyepoxide is 70° C. and the weight per epoxide is 475.

Example 11

A resinous solution is prepared by combining 140 parts by weight of the polyepoxide of Example 10 with sixty parts by weight of xylene. In a portion of this resinous solution (thirty parts by weight) are dissolved 2.6 parts by weight of diaminodiphenyl sulfone and 0.3 part by weight of anhydrous benzyltrimethyl ammonium chloride. The mixture is poured into a closed container, to prevent the escape of the volatile material, and is heated at 150° C. Gelation occurs after heating for 42 minutes.

Another portion of the resinous solution (thirty parts by weight) and 2.6 parts by weight of diaminodiphenyl sulfone treated in the same manner, but excluding the accelerator, does not gel after heating at 150° C. for 115 minutes.

Example 12

In a reaction vessel fitted with a stirrer, thermometer and condenser, four mols of bis(4-hydroxyphenyl)-2,2-propane (bisphenol) and five mols of epichlorhydrin are added to 6.43 mols of sodium hydroxide as a ten percent aqueous solution. While being stirred, the reaction mixture is gradually heated to about 100° C. during eighty minutes time and is maintained at 100° C. to 104° C. for an additional sixty minutes under reflux. The aqueous layer is decanted and the resin is washed with boiling water until neutral to litmus whereupon the resin is drained and dehydrated by heating to about 150° C. The resulting polyepoxide has a softening point of 100° C. (Durrans' mercury method) and a weight per epoxide of 950.

Example 13

In a suitable container, ten parts by weight of the polyepoxide of Example 12, ten parts by weight of xylene, 0.65 part by weight of diaminodiphenyl sulfone and 0.18 part by weight of anhydrous benzyltrimethyl ammonium chloride are combined and heated to 150° C. to effect solution whereupon the composition is poured into an aluminum cup and is heated at 150° C. until gelation occurs, a period of 176 minutes.

Another portion of the polyepoxide of Example 12 (ten parts by weight) combined with ten parts by weight of xylene and 0.65 part by weight of diaminodiphenyl sulfone, treated in the same manner but with the exclusion of the accelerator, requires 256 minutes of heating at 150° C. to accomplish gelation.

The foregoing examples illustrate the utility of this invention in preparations where rapid cures are important. The use of higher molecular weight epoxides is rendered somewhat more difficult by the selection of a solvent which is non-reactive with the amine, the quarternary ammonium salt or the epoxide resin, but there will be instances where such high molecular weight epoxides are desirable. Ketones or dioxane can generally be used. Other modifications and variations will also occur to those skilled in the art. Such modifications are considered within the scope of the invention.

What is claimed is:

1. In the process for resinifying and curing a glycidyl polyether of a polyhydric compound of the group consisting of polyhydric phenols and polyhydric alcohols, said glycidyl polyether having an epoxy equivalency greater than one, wherein the glycidyl polyether and an amine curing agent selected from the group consisting of primary and secondary amines are reacted at an elevated temperature below about 200° C., and in a ratio of 0.2 to 1.5 amine equivalents per epoxide equivalent, the improvement which comprises reacting the glycidyl polyether and the amine in the presence of from 0.1 percent to 10 percent of an activator for the amine curing agent comprising a quaternary ammonium salt selected from the group consisting of tetraalkyl, aryl trialkyl and alkaryl trialkyl ammonium salts of strong acids, wherein the aryl, alkaryl and alkyl substituents each have no more than eight carbon atoms, considering an epoxide equivalent as the weight in grams of glycidyl polyether per epoxide group and an amine equivalent as the weight in grams of amine per amino-substituted hydrogen atom.

2. The process as defined in claim 1, wherein the polyether is a normally liquid glycidyl polyether of a dihydric phenol.

3. The process as defined in claim 2, wherein the quaternary ammonium salt is a quaternary ammonium halide.

4. The process as defined in claim 2, wherein the quaternary ammonium salt is benzyltrimethyl ammonium chloride.

5. The process as defined in claim 3, wherein the quaternary ammonium halide is employed as an aqueous solution of quaternary ammonium halide.

6. A process for resinifying and curing a glycidyl polyether of a polyhydric phenol, which comprises mixing the glycidyl polyester with not more than 1.5 equivalents per epoxy equivalent of an amine curing agent selected from the group consisting of the primary and secondary amines and from 0.1 to ten percent by weight of the polyether-amine mixture of a quaternary ammonium halide and heating the mixture to a temperature in the range of about 40° C. to about 200° C.

References Cited in the file of this patent

UNITED STATES PATENTS

| | | |
|---|---|---|
| 2,752,269 | Condo et al. | June 26, 1956 |
| 2,768,992 | Zukas | Oct. 30, 1956 |